US012623614B2

(12) United States Patent
Wu

(10) Patent No.: US 12,623,614 B2
(45) Date of Patent: May 12, 2026

(54) CAR RADIATOR GRILLE

(71) Applicant: COPLUS INC., Tainan City (TW)

(72) Inventor: Jacob Wu, Tainan City (TW)

(73) Assignee: COPLUS INC., Tainan City (TW)

( * ) Notice: Subject to any disclaimer, the term of this patent is extended or adjusted under 35 U.S.C. 154(b) by 489 days.

(21) Appl. No.: 18/210,067

(22) Filed: Jun. 14, 2023

(65) Prior Publication Data

US 2024/0051483 A1     Feb. 15, 2024

Related U.S. Application Data

(60) Provisional application No. 63/397,652, filed on Aug. 12, 2022.

(51) Int. Cl.
*B60R 13/00* (2006.01)
*B60Q 1/26* (2006.01)
*B60Q 1/50* (2006.01)
*B60R 19/50* (2006.01)
*B60R 19/52* (2006.01)

(52) U.S. Cl.
CPC ............ *B60R 13/005* (2013.01); *B60Q 1/503* (2013.01); *B60R 19/52* (2013.01); *B60Q 1/2661* (2013.01); *B60R 2019/505* (2013.01); *B60R 2019/525* (2013.01)

(58) Field of Classification Search
CPC . B60R 13/005; B60R 19/52; B60R 2019/505; B60R 2019/525; B60R 13/00; B60Q 1/503; B60Q 1/2661; B60Q 1/50; B60Q 1/26; B60Q 19/50

USPC ......... 40/413, 541, 546, 584, 588, 591, 714, 40/716, 911; 362/487, 496, 502
See application file for complete search history.

(56) References Cited

U.S. PATENT DOCUMENTS

| | | | |
|---|---|---|---|
| 10,281,113 B1 * | 5/2019 | Salter | B60R 19/483 |
| 2018/0363877 A1 * | 12/2018 | Salter | F21S 45/48 |
| 2023/0151956 A1 * | 5/2023 | Tian | F21V 23/003 362/546 |

* cited by examiner

*Primary Examiner* — Justin V Lewis
(74) *Attorney, Agent, or Firm* — CKC & Partners Co., LLC

(57) ABSTRACT

A car radiator grille is installed to a front end of a car, and includes a frame, a grille mesh, an indicator lamp, a fixing member, and a fixing column. The frame surrounds a hollow area. The grille mesh is disposed in the hollow area, and provided with a plurality of mesh holes. These mesh holes are communicated with a front side and a rear side of the grille mesh. The indicator lamp includes a body disposed on the front side of the grille mesh, and a light source disposed on a front surface of the body. The fixing member is disposed on the rear side of the grille mesh. The fixing column is passed through one of the mesh holes, and connected with the fixing member and the rear surface of the body, so as to clamp the grille mesh between the body and the fixing member.

13 Claims, 17 Drawing Sheets

CAR RADIATOR GRILLE

This non-provisional application claims priority claim under 35 U.S.C. § 119(a) on U.S. Provisional Patent Application No. 63/397,652 filed on Aug. 12, 2022, the entire contents of which are incorporated herein by reference.

FIELD OF THE INVENTION

This disclosure is related to vehicle parts, in particular to a car radiator grille.

BACKGROUND

A car radiator grille is used to protect the car radiator. In addition, additional indicator lamps can be disposed on the car radiator grille to decorate the car or provide an indication function.

Generally, the aforementioned indicator lamps are made by the car manufacturer or the car radiator grille manufacturer after deciding on the text or the pattern to be presented. The presented text or pattern is usually the car brands, logos, or texts/patterns representing a specific vehicle model. The manufacturer may design the texts/patterns to be presented according to the requirement of a specific theme.

The aforementioned fixed texts/patterns are not necessarily preferred by the consumer/vehicle user. Even if the consumer/vehicle user can buy a car radiator grille with other texts/patterns from the market, these texts/patterns may not be preferred by the consumer/vehicle user.

Furthermore, for car radiator grille manufacturers, the same specifications but different texts/patterns represent different products. Car radiator grille manufacturers need to prepare inventory for different products to meet the market demand. However, the inventory incurs additional costs, and it is difficult to determine the amount of inventory needed for different products.

SUMMARY

In view of the above problem, this disclosure provides a car radiator grille that allows for easy replacement of indicator lamps.

The disclosure provides a car radiator grille configured to be installed to a front end of a car. The car radiator grille includes a frame, a grille mesh, an indicator lamp, a fixing member, and a fixing column. The frame surrounds a hollow area. The grille mesh is disposed in the hollow area, and includes a plurality of mesh holes communicated with a front side and a rear side of the grille mesh. The indicator lamp includes a body and a light source. The light source is disposed on a front surface of the body. The body is disposed on the front side of the grille mesh, and contacts the front side of the grille mesh via a back surface thereof. The fixing member is disposed on the rear side of the grille mesh. The fixing column is connected to the back surface of the body and the fixing member by passing through one of the mesh holes so as to clamp the grille mesh between the body and the fixing member.

In at least one embodiment, the back surface of the body is configured with a plurality of inserting holes, the fixing column is a detachable member that is connected to the back surface of the body, and can be selectively inserted into one the plurality of inserting holes.

In at least one embodiment, the indicator lamp further includes a positioning rod that protrudes from the back surface of the body, and passes through one of the plurality of mesh holes.

In at least one embodiment, the indicator lamp further includes a positioning bump that protrudes from the back surface of the body and can be embedded into a correspondingly shaped mesh hole.

In at least one embodiment, the indicator lamp further includes a convex column that is located at the back surface of the body, and connected to the fixing column.

In at least one embodiment, the fixing column is a bolt, and the fixing member is a nut.

In at least one embodiment, the fixing column is a bolt, and the fixing member is a hand-rotatable fixed member that includes a nut and a cup-shaped hand-rotatable portion combined with the nut.

In at least one embodiment, the fixing column is a plate disposed on the rear side of the grille mesh; the fixing column is a blot that passes through the back surface of the fixing column, and locks into the back surface of the body.

In at least one embodiment, the car radiator grille further includes a plurality of the indicator lamps and a plurality of the fixing columns; each of the plurality of the fixing columns is connected to the back surface of the corresponding body and the corresponding fixing member, respectively, so as to clamp the grille mesh between the plurality of the indicator lamps and the fixing member.

In at least one embodiment, the car radiator grille further includes a spacer that is disposed on the front side of the grille mesh, and located between the front side of the grille mesh and the back surface of the body.

In at least one embodiment, the spacer is provided with a back surface that matches a curvature of the front side of the grille mesh, and provided with a front surface that matches a curvature of the back surface of the body.

In at least one embodiment, the spacer further includes a positioning rod that protrudes from the back surface of the spacer and passes through one of the plurality of mesh holes.

In at least one embodiment, the spacer further includes a positioning bump that protrudes from the back surface of the spacer and can be embedded into a correspondingly shaped mesh hole.

In at least one embodiment, the fixing column extends from the back surface of the body; the fixing member is a hook protruding from an end of the fixing column, and latches on the rear side of the grille mesh by passing through one of the plurality of mesh holes.

In at least one embodiment, the fixing member is an annular buckle having a buckle hole at a center thereof; the buckle hole is provided at the edge thereof with a plurality of elastic buckle pieces for buckling on a surface of the fixing column.

In at least one embodiment, the surface of the fixing column is formed with at least one annular groove for the plurality of elastic buckle pieces to be buckled into.

Through the above combination, users can quickly replace the detachable indicator lamps and arrange their desired combination of texts/patterns, without being limited to the manufactured configuration of the car radiator grille. Furthermore, the manufacturers do not need to prepare inventories for different combinations of texts/patterns on the car radiator grille. The manufacturers only have to install the corresponding combination of texts/patterns according to the purchase order when the products are going to be shipped, so as to minimize inventories.

DETAILED DESCRIPTION OF THE PREFERRED EMBODIMENTS

Figure 1:
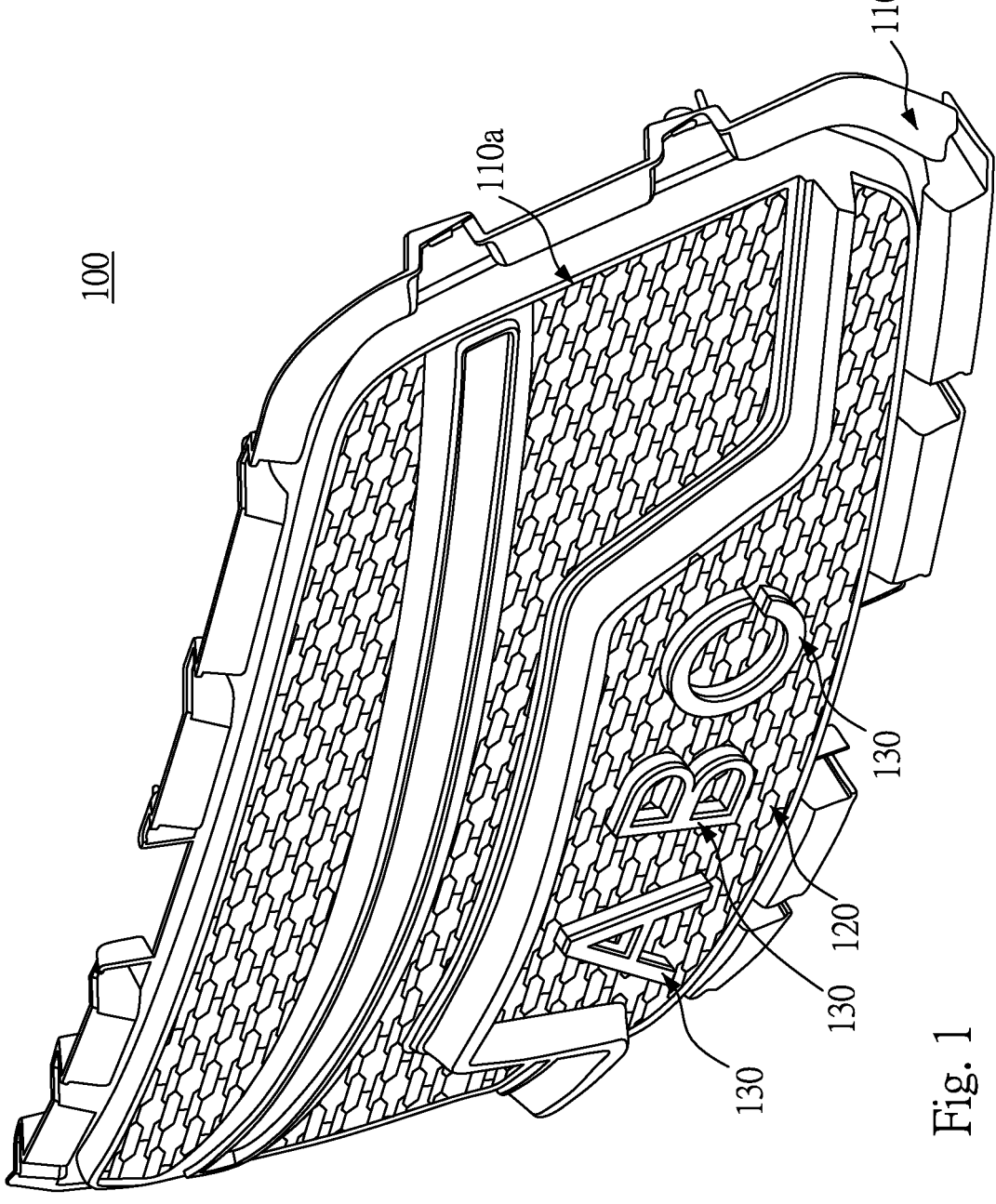
FIG. 1 is a perspective view according to a first embodiment of the disclosure.
Figure 2:
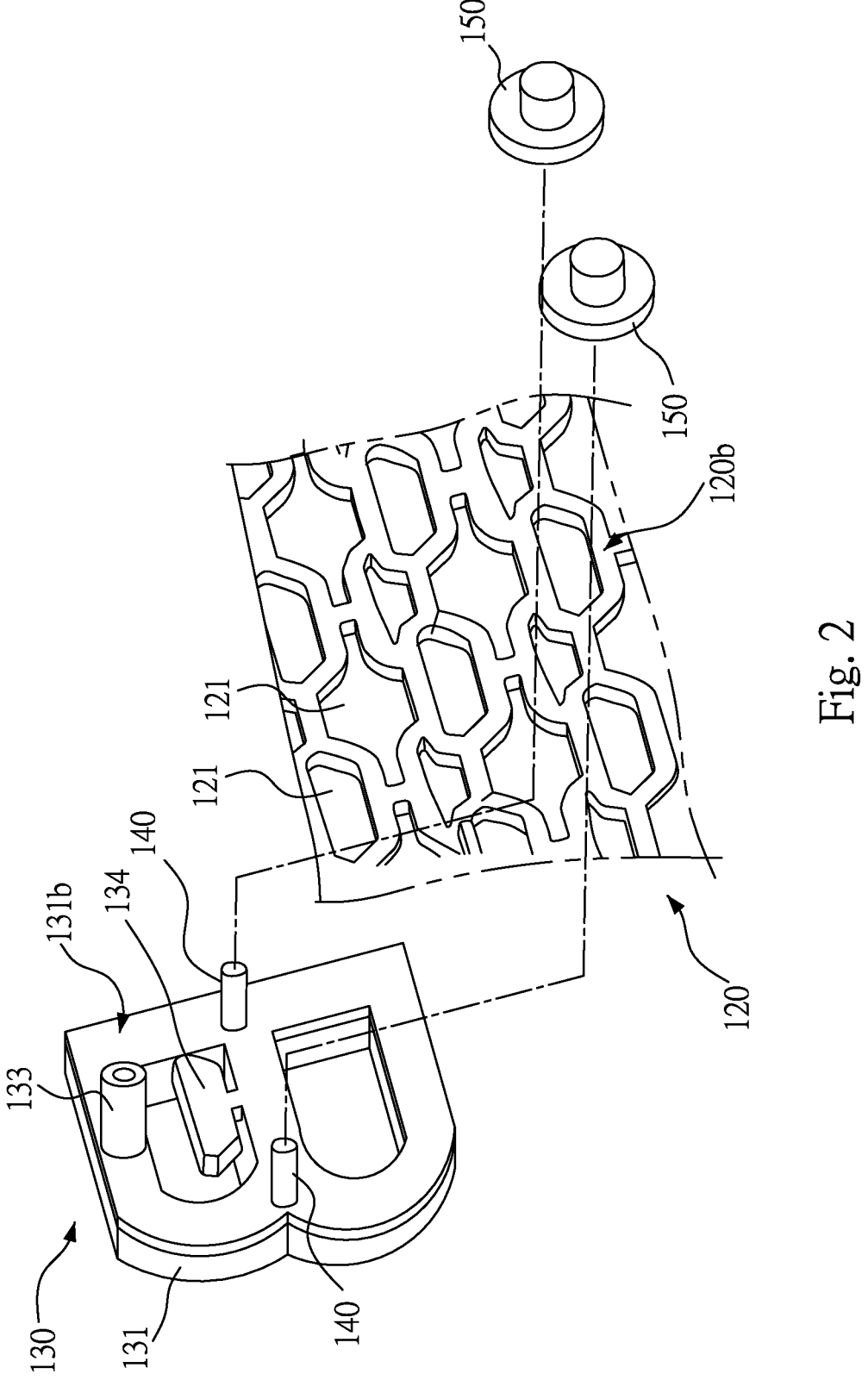
FIG. 2 is an exploded perspective view of some components in the first embodiment of the disclosure.
Figure 3:
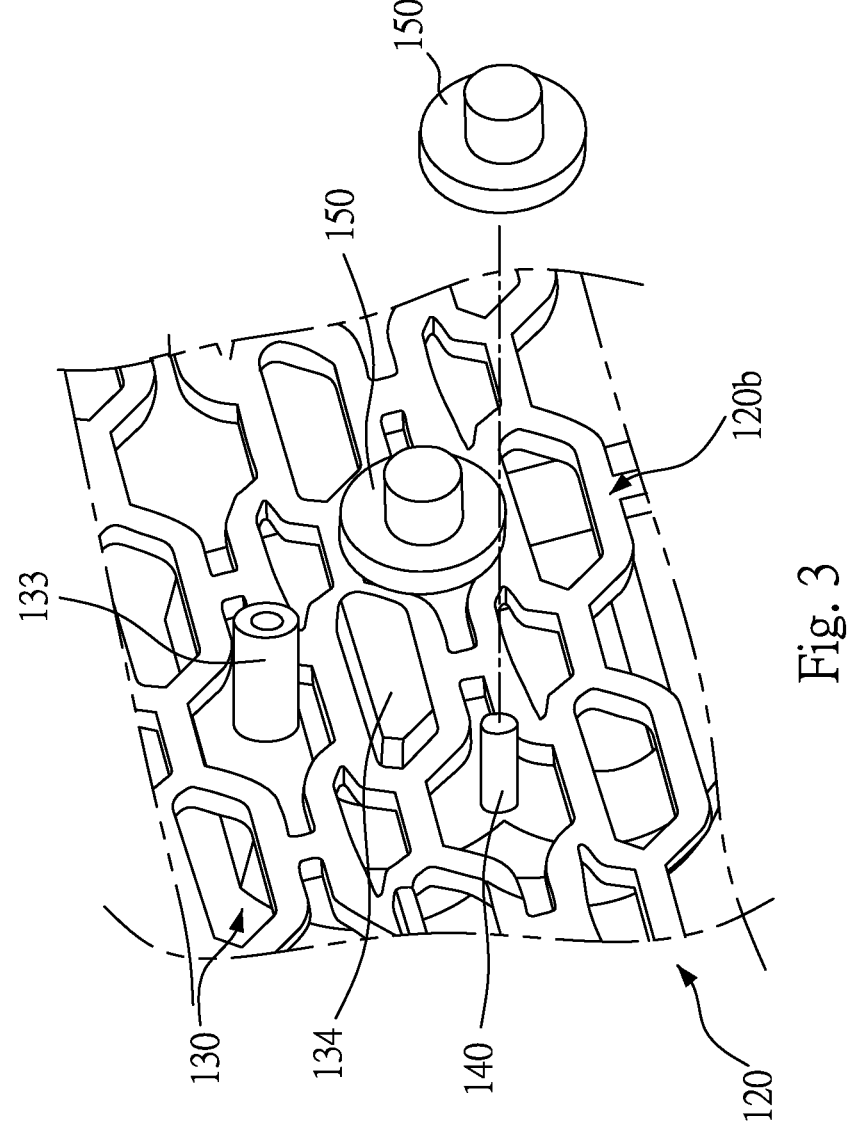
FIG. 3 is an exploded perspective view of some components in the first embodiment of the disclosure.

Referring to FIG. 1, FIG. 2 and FIG. 3, a car radiator grille 100 according to a first embodiment of this disclosure is adapted to be installed to a front end of a car. The car radiator grille 100 includes a frame 110, a grille nesh 120, an indicator lamp 130, a fixing column 140, and a fixing member 150.

As shown in FIG. 1 and FIG. 2, the frame 110 surrounds a hollow area 110a. The grille mesh 120 is disposed in the hollow area 110a, and provided with a plurality of mesh holes 121. The mesh holes 121 are communicated with a front side 120a and a rear side 120b of the grille mesh 120. Cooperating with the associated coupling elements, the mesh holes 121 may have the same shapes, or some of the mesh holes 121 have specific shapes.

As shown in FIG. 1, FIG. 2, FIG. 4, and FIG. 5, the indicator lamp 130 includes a body 131 and a light source 132. The light source 132 is disposed on a front surface 131a of the body 131. The body 131 is disposed on the front side 120a of the grille nesh 120, and contacts the front side 120a of the grille nesh 120 via a back surface 131b thereof. Specifically, the curvature of the back surface 131b of the body 131 can match the curvature of the front side 120a, so that the body 131 can be closely attached to the front side 120a of the grille net 120.

Figure 4:
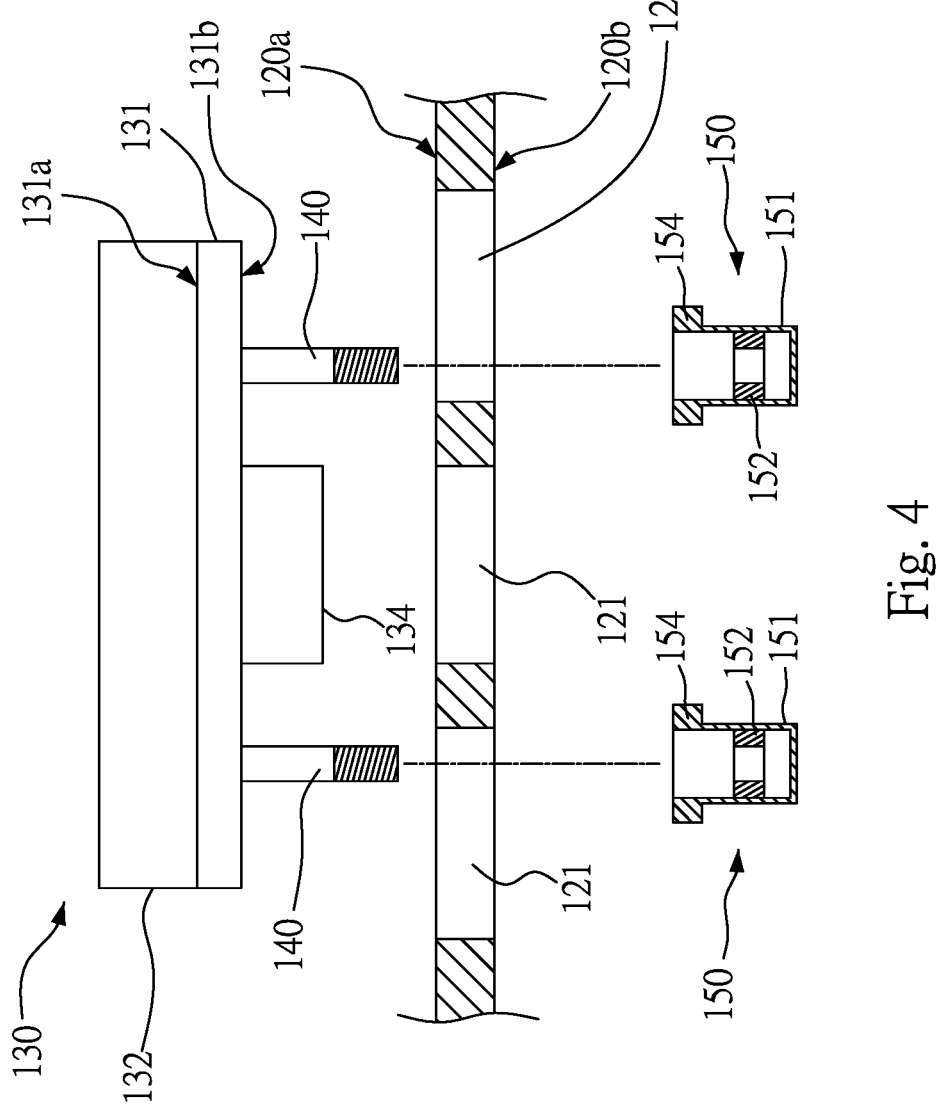
FIG. 4 is a cross-section view of some components in the first embodiment of the disclosure.
Figure 5:
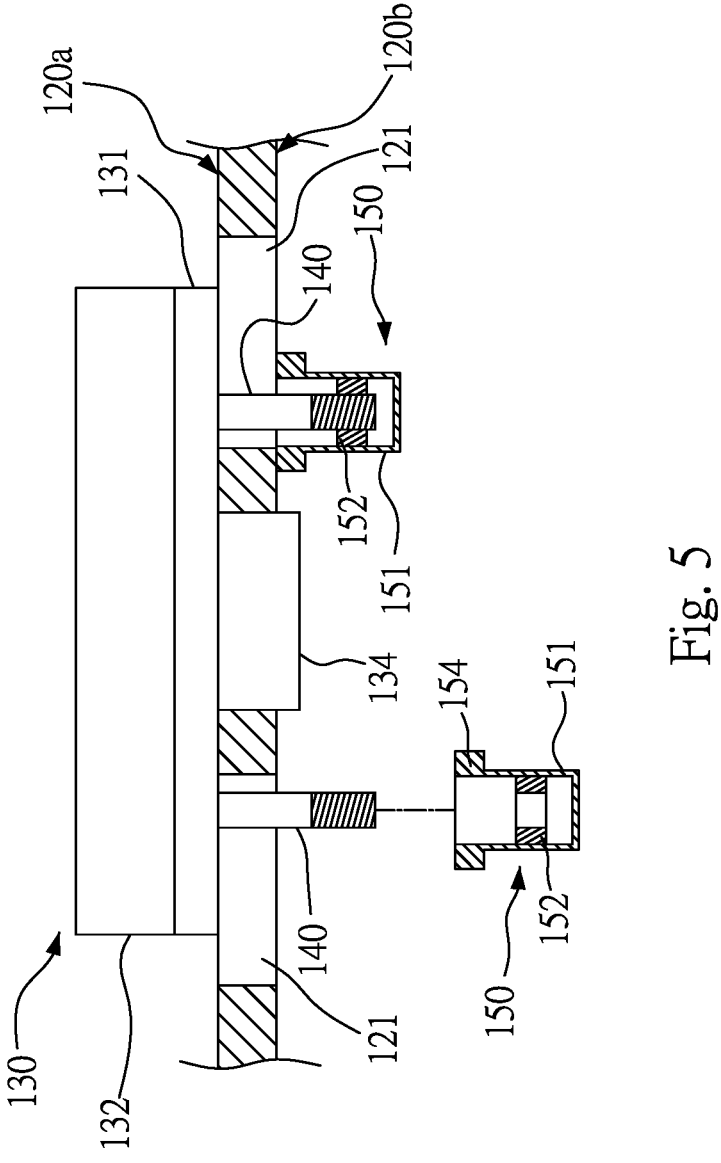
FIG. 5 is a cross-section view of some components in the first embodiment of the disclosure.

As shown in FIG. 4 and FIG. 5, the fixing column 140 is provided with one end connected to the back surface 131b of the body 131, and provided with other end passed through the mesh hole 121 of the grille nesh 120. The fixing member 150 is disposed on the rear side 120b of the grille mesh 120, and combined with the fixing column 140 so as to clamp the grille mesh 120 between the indicator lamp 130 and the fixing member 150, and further fix the indicator lamp 130 on the front end 120a of the grille mesh 120.

As shown in FIG. 1, FIG. 4 and FIG. 5, the car radiator grille 100 can further includes a plurality of indicator lamps 130 and a plurality of fixing column 140. The fixing columns 140 are combined with the corresponding fixing members 150 by passing through the grille mesh 120, so as to clamp the grille mesh 120 between the indicator lamps 130 and the fixing members 150. That is, the indicator lamps 130 are fixed on the front side 120a of the grille mesh 120 in a detachable manner.

As shown in FIG. 4 and FIG. 5, specifically, the fixing column 140 is a bolt, and the fixing member 150 is a nut. Alternatively, the fixing member 150 is a hand-rotatable fixing member. The hand-rotatable fixing member includes a nut 154 and a cup-shaped hand-rotatable portion 151 combined with the nut 154. User can rotate the hand-rotatable fixing member 150 by the hand-rotatable portion 151. The fixing column 140 is provided with the one end buried under the back surface 131b of the body 131, and provided with the other end with external threads. The fixing member 150 includes a fixing hole 152 that is designed to accommodate the fixing column 140 for insertion. This allows the fixing member 150 to be combined with the fixing column 140 in a way that locks the threads together.

For facilitating the positioning and installation of the indicator lamp 130, the indicator lamp 130 further includes a positioning structure. As shown in FIG. 2, FIG. 3, FIG. 4, and FIG. 5, the positioning structure protrudes from the back surface 131b of the body 131, and may be a positioning rod 133 or a positioning bump 134. The indicator lamp 130 can be temporarily installed and positioned on the grille mesh 120 by the positioning structure passing through the corresponding mesh hole 121.

As shown in FIG. 2 and FIG. 3, in the case of the positioning structure being the positioning rod 133, which protrudes from the back surface 131b of the body 131. The positioning rod 133 is used to help the installation and positioning of the indicator lamp 130 by passing through a corresponding mesh hole 121. Besides, the indicator lamp 130 is temporarily hanged on the grille mesh 120 by the positioning rod 133 before the fixing member 150 is combined with the fixing column 140.

As shown in FIG. 2, FIG. 3, FIG. 4, and FIG. 5, in the case of the positioning structure being the positioning bump 134, which protrudes from the back surface 131b of the body 131. The positioning block 134 can be embedded into a correspondingly shaped mesh hole 121. When the positioning block 134 has been inserted into the correspondingly shaped mesh hole 121, it can help the positioning of the indicator lamp 130 so as to temporary fix the indicator lamp 130 at a predetermined position on the grille mesh 120. The positioning bump 134 is especially suitable for the combination of the grille mesh 120 and the indicator lamp 130. By using the positioning bump 134 in combination with a correspondingly shaped mesh hole 121, the indicator lamp 130 can be positioned in the correct installation location. It should be noted that one of the positioning rod 133 and the positioning 134 can be selectively configured on the indicator lamp 130, or the positioning rod 133 and the positioning 134 can be configured on the same indicator lamp 130 at the same time.

Figure 6:
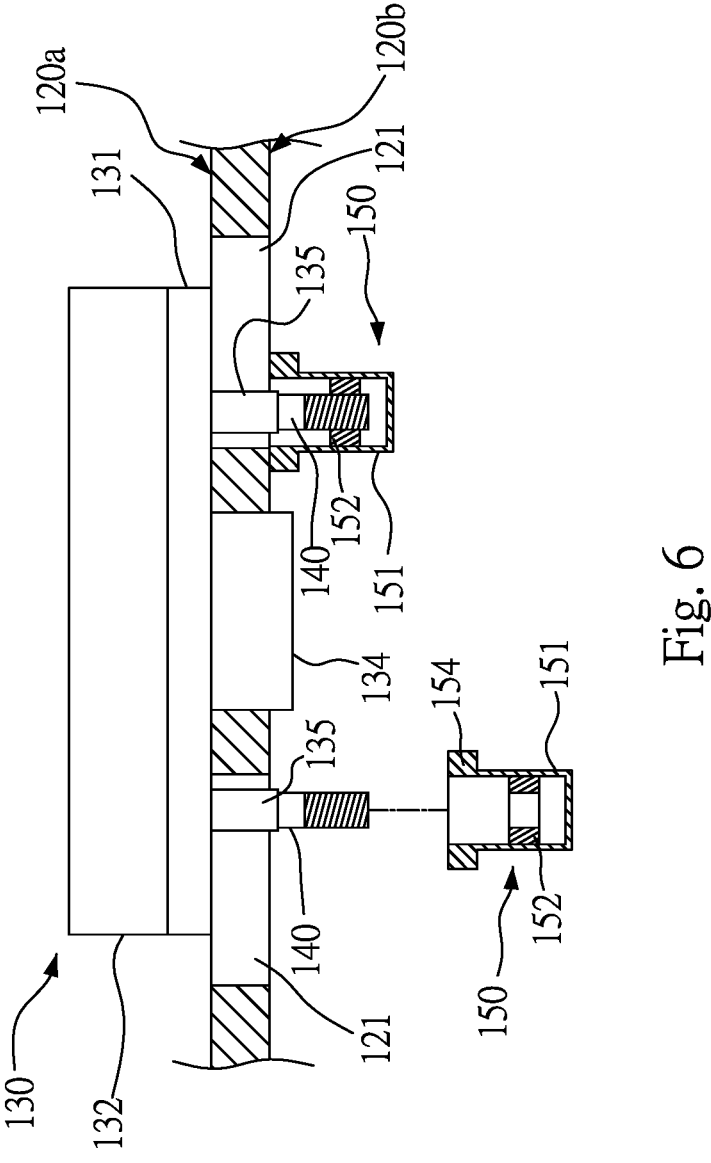
FIG. 6 is another cross-section view of some components in the first embodiment of the disclosure.

As shown in FIG. 6, in one specific embodiment, the indicator lamp 130 further includes a convex column 135. The convex column 135 is located at the back surface 131b of the body 13, and connected to the fixing column 140. In the case of the fixing member 150 to be the nut, the convex column 135 does not protrude from the rear side 120*b* of the grille mesh 120. In the case of the fixing member 150 to be the hand-rotatable fixing member, the cup-shaped hand-rotatable portion 151 will be used to cover the protruding of the convex column 135.

Figure 7:
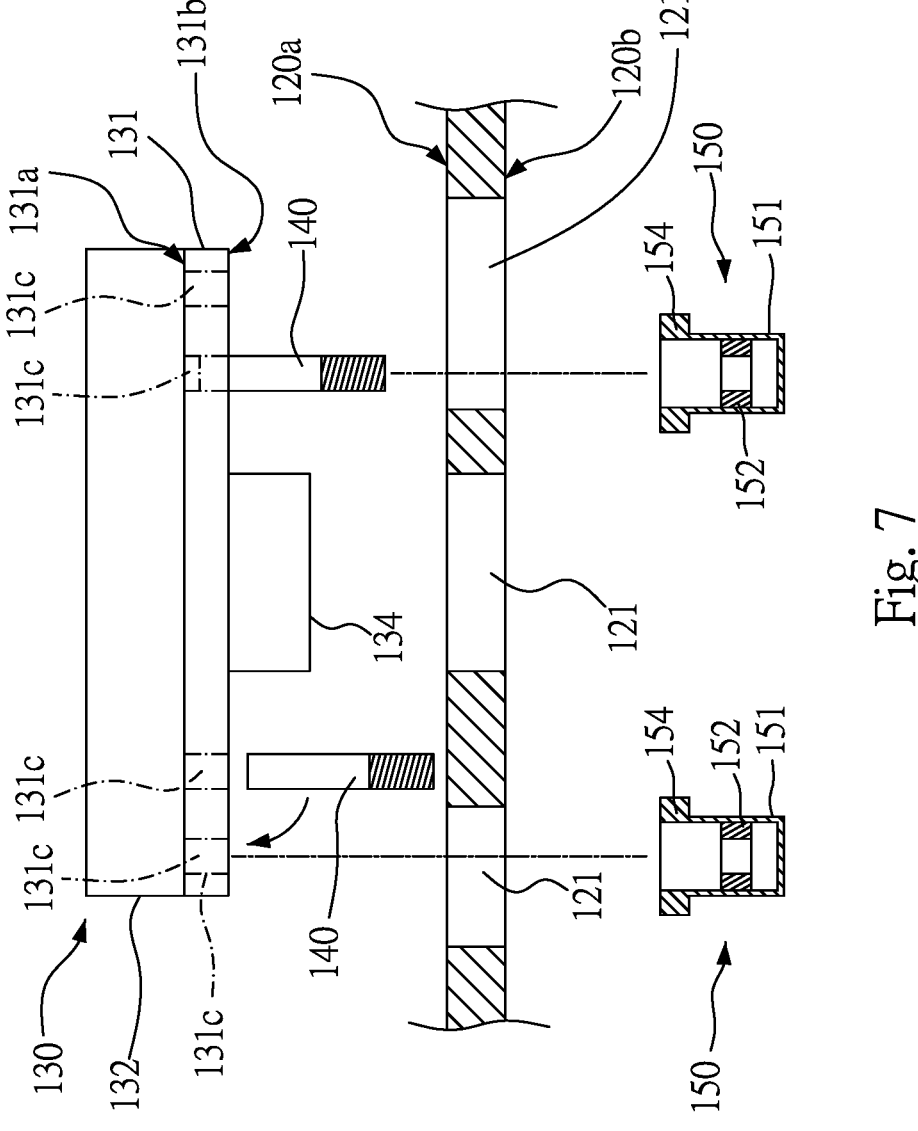
FIG. 7 is a cross-section view of some components in a second embodiment of the disclosure.
Figure 8:
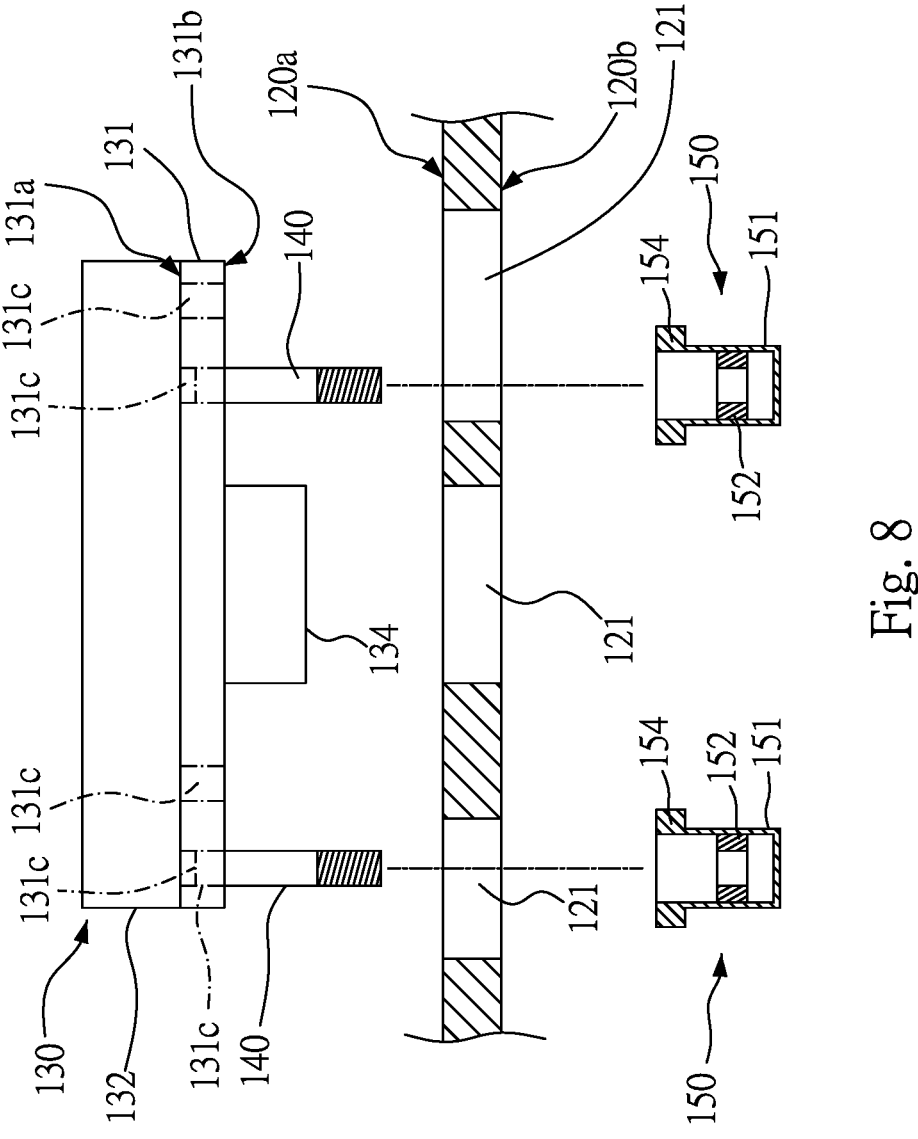
FIG. 8 is another cross-section view of some components in the second embodiment of the disclosure.

As shown in FIG. 7 and FIG. 8, in a second embodiment of the disclosure, the back surface 131*b* of the body 131 is configured with a plurality of inserting holes 131*c*. The fixing column 140 is a detachable member that is connected to the back surface 131*b* of the body 131, and can be selectively inserted into the corresponding inserting hole 131*c* on the back surface 131*b* of the body 131, or detached from the corresponding inserting hole 131*c* on the back surface 131*b* of the body 131. Besides, when the fixing column 140 wants to fix at a designated position on the grille mesh 120, it may be blocked by the physical parts of the grille mesh 120, and unable to pass through the mesh hole 121 of the grille mesh 120, resulting in the indicator lamp 130 not being able to be fixed at the designated position on the grille mesh 120. In the second embodiment of the FIG. 6 and FIG. 7, by configuring the plurality of inserting holes 131*c* on the back surface 131*b* of the body 131, the fixing column 140 can be selectively inserted into an suitable inserting hole 131*c* that is not blocked by the physical parts of the grille mesh 120 so that the indicator lamp 130 can be fixed at the designated position on the grille mesh 120.

Figure 9:
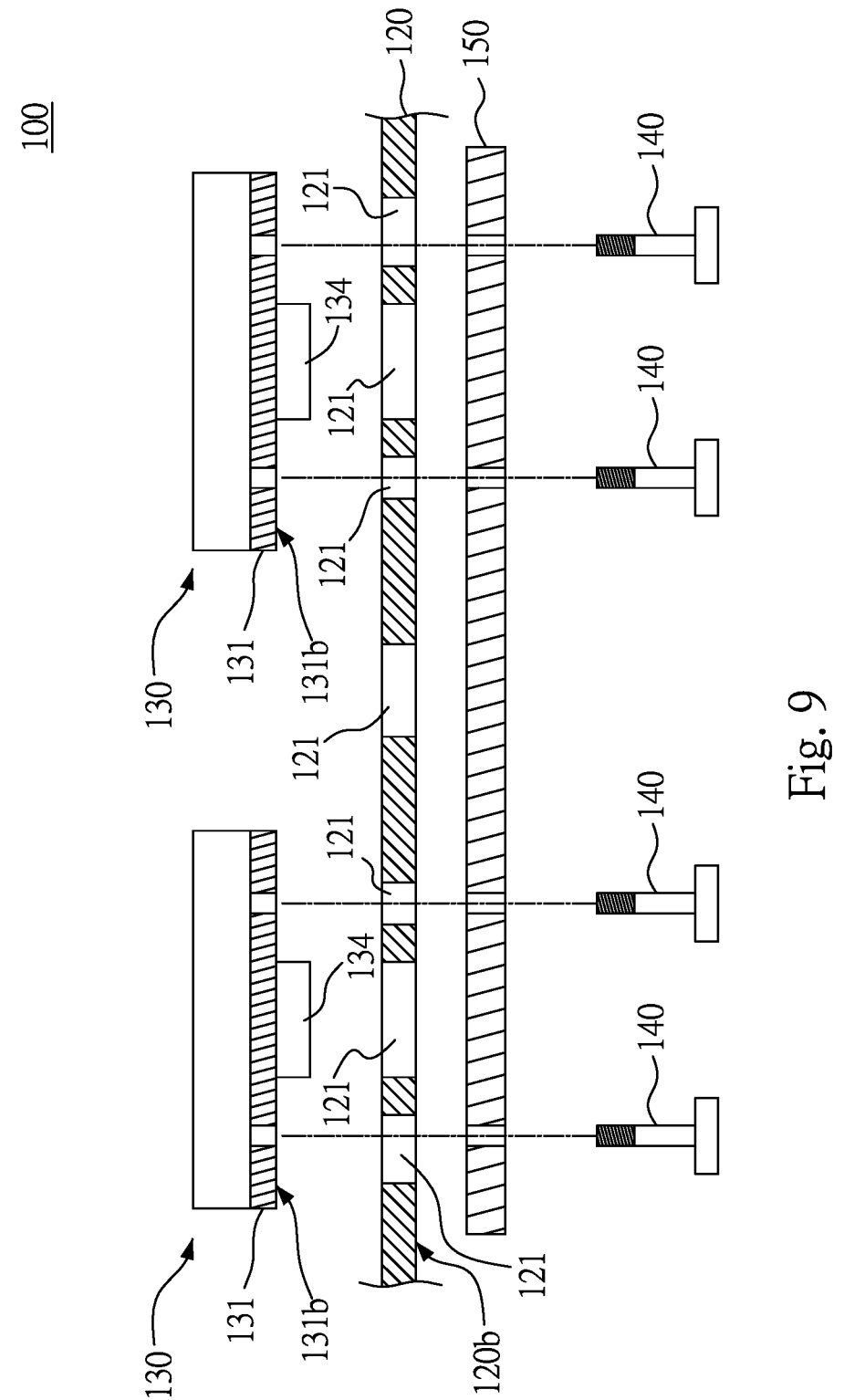
FIG. 9 is a cross-section view of some components in a third embodiment of the disclosure.
Figure 10:
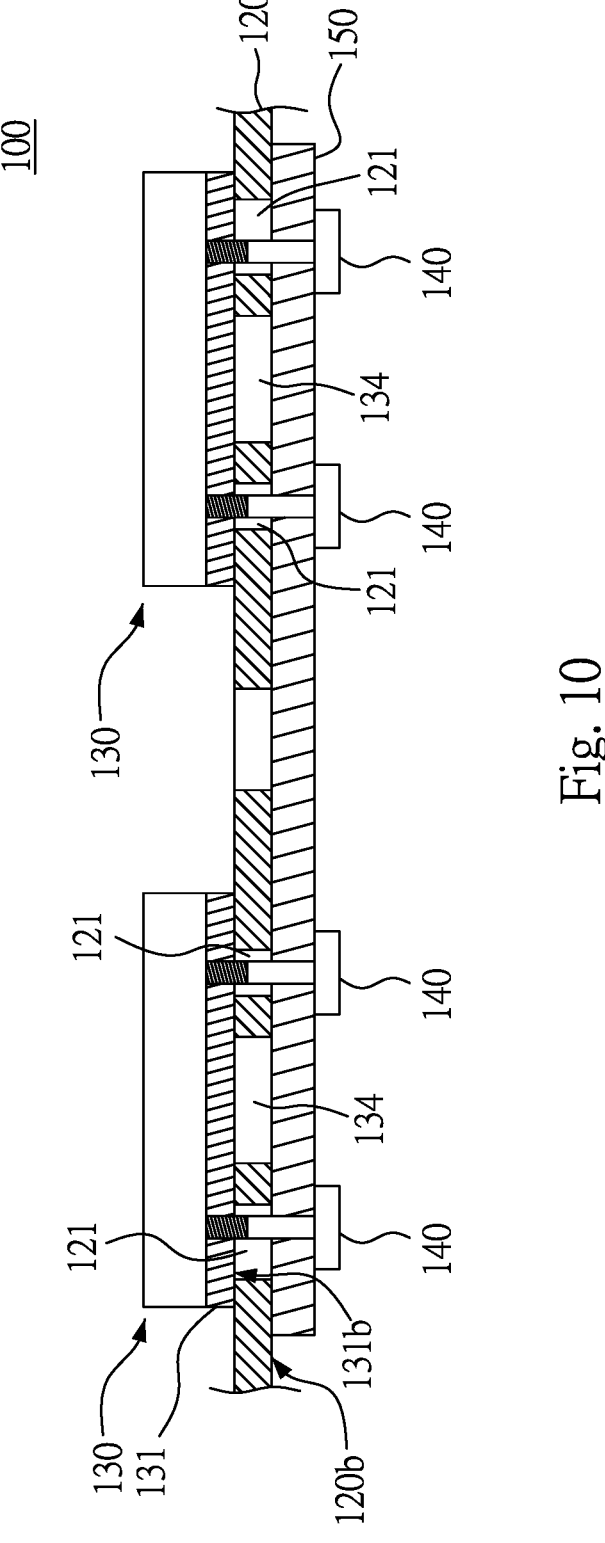
FIG. 10 is a cross-section view of some components in the third embodiment of the disclosure.

As shown in FIG. 9 and FIG. 10, in a third embodiment of the disclosure, the fixing member 150 is a plate disposed on the rear side 120*b* of the grille mesh 120. The plurality of fixing columns 140 are connected to the back surfaces 131*b* of the plurality of bodies 131 and the fixing member 150 by passing through the mesh holes 121 of the grille mesh 120 so as to clamp the grille mesh 120 between the indicator lamps 130 and the fixing member 150. In a specific embodiment, each of the fixing columns 140 is a bolt that passes through the fixing member 150, and locks into the back surface 131*b* of the body 13. That is, in the third embodiment, the single fixing member 150 corresponds to multiple indicator lamps 130, and thus multiple indicator lamps 130 are fixed simultaneously based on a combination of the single fixing member 150 and multiple fixing columns (such as bolts) 140.

Figure 11:
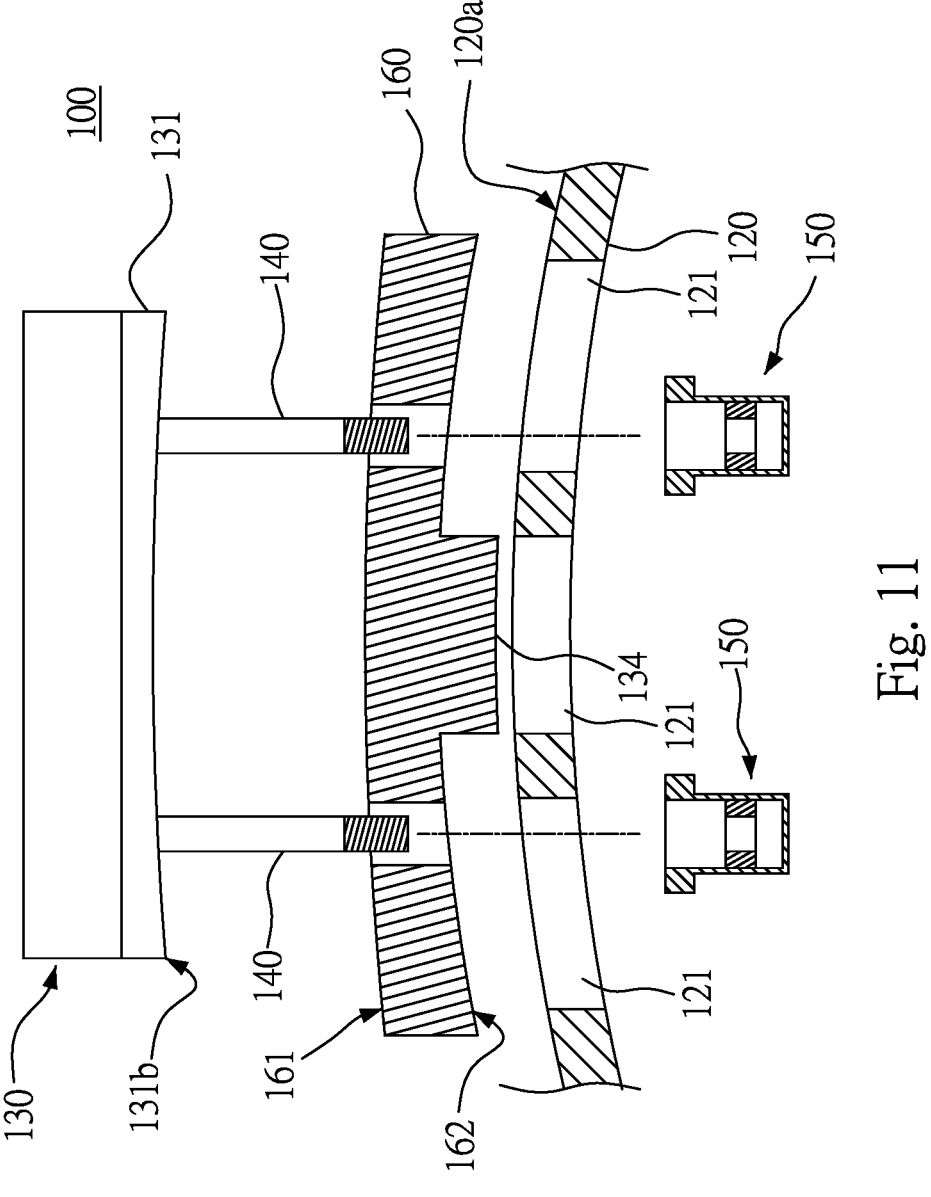
FIG. 11 is a cross-section view of some components in a fourth embodiment of the disclosure.
Figure 12:
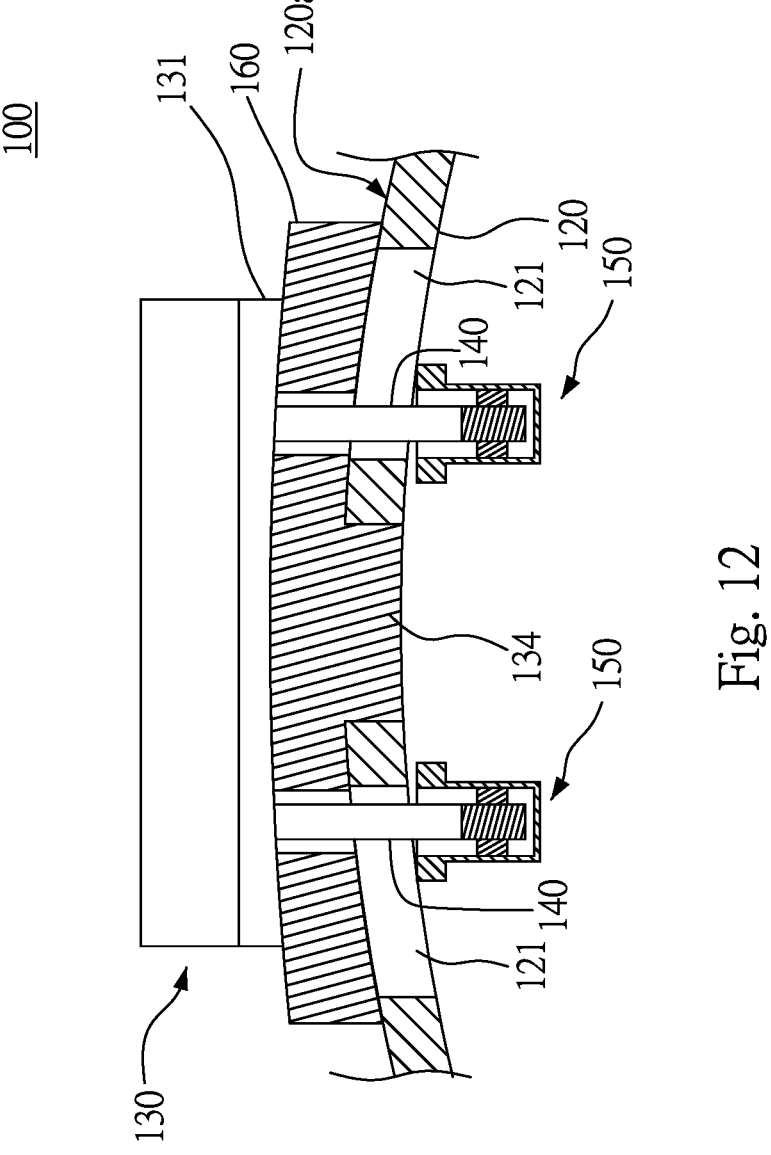
FIG. 12 is a cross-section view of some components in the fourth embodiment of the disclosure.

As shown in FIG. 11 and FIG. 12, in a fourth embodiment of the disclosure, the car radiator grille 100 further includes a spacer 160 disposed on the front side 120*a* of the grille mesh 120, and located between the front side 120*a* of the grille mesh 120 and the back surface 131*b* of the body 13.

As shown in FIG. 11 and FIG. 12, the spacer 160 has a back surface 162 designed to fit the curvature of the front side 120*a* of the grille mesh 120, and a front surface 161 designed to fit the curvature of the back surface 131*b* of the body 13. The curvatures of the front surface 161 and back surface 162 of the spacer 160 can be adjusted to match the indicator lamp 130 and the model of the car radiator grille 100. This prevents the problem of the indicator lamp 130 being unable to align with the front side 120*a* of the grille mesh 120 due to differences in the model of the car radiator grille 100. Therefore, by replacing the spacer 160, the curvature of the back surface 131*b* of the body 13 does not need to match the curvature of the front side 120*a* of the grille mesh 120 so that the indicator lamp 130 can be fixed on the different curvature of grille mesh 120. In the disclosure, the fixing methods for the indicator lamp 130 can refer to the above-mentioned embodiments. In one embodiment, each indicator lamp 130 can be separately fitted with a spacer 160. In other embodiment, the spacer 160 is designed as a long plate, so that a single spacer 160 can cooperate with multiple indicator lamps 130 at the same time.

Figure 13:
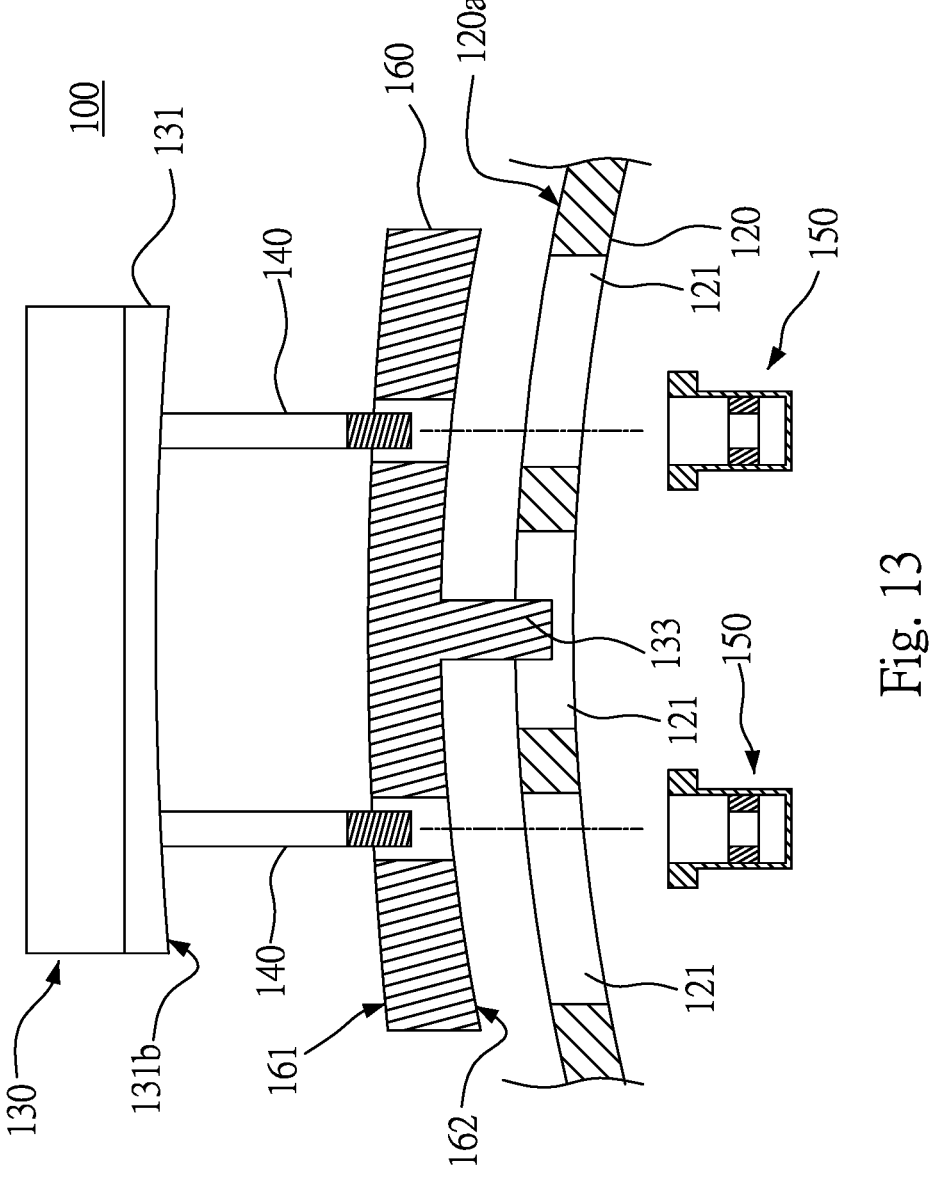
FIG. 13 is another cross-section view of some components in the fourth embodiment of the disclosure.

As shown in FIG. 11, FIG. 12, and FIG. 13, in order to facilitate the positioning and installation of the spacer 160, the spacer 160 may also be configured with a positioning structure. The positioning structure is a positioning rod 133 or a positioning bump 134 that protrudes from the back surface 162 of the spacer 160. The positioning rod 133 or the positioning bump 134 of the spacer 160 can pass through the corresponding mesh hole 121 in order to assist the installation and the positioning of the spacer 160, and further temporarily fix the indicator lamp 130 on the grille mesh 120.

As shown in FIG. 11 and FIG. 12, in the case of the positioning structure to be the positioning bump 134, which protrudes from the back surface 162 of the spacer 160, and are embedded into a correspondingly shaped mesh hole 121. It should be noted that one of the positioning rod 133 and the positioning 134 can be selectively configured on the spacer 160, or the positioning rod 133 and the positioning 134 can be configured on the same the spacer 160 at the same time.

As shown in FIG. 13, in the case of the positioning structure to be the positioning rod 133, which protrudes from the back surface 162 of the spacer 16, and passes through a corresponding mesh hole 121. The positioning rod 133 is used to help the installation and positioning of the indicator lamp 130 by passing through the corresponding mesh hole 121. Besides, before the fixing member 150 is combined with the fixing column 140, the indicator lamp 130 is temporarily hanged on the grille mesh 120 by the positioning rod 133.

Figure 14:
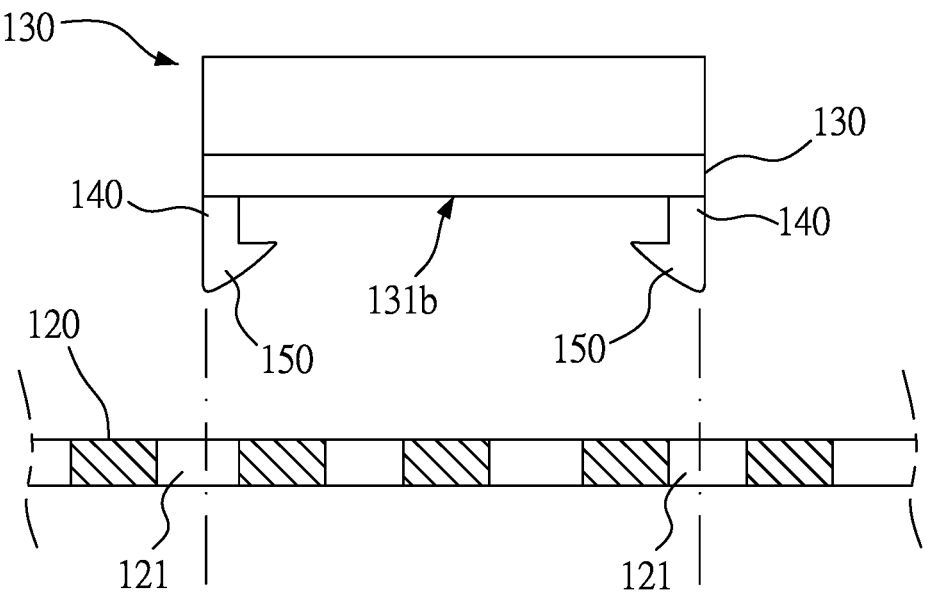
FIG. 14 is a cross-section view of some components in a specific embodiment of the disclosure.
Figure 15:
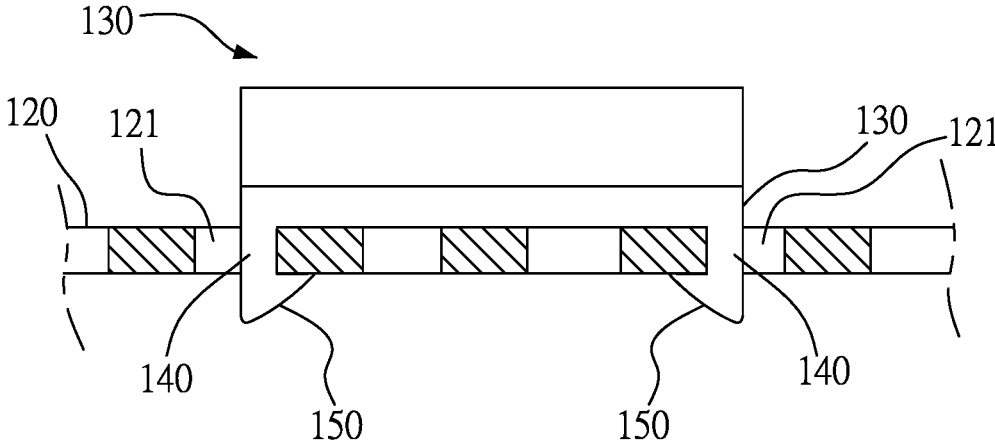
FIG. 15 is a cross-section view of some components in the specific embodiment of the disclosure.

Referring to FIG. 14 and FIG. 15, in one specific embodiment, the fixing column 140 extends from the back surface 131*b* of the body 131 or the back surface 162 of the spacer 16. The fixing member 150 is a hook protruding from an end of the fixing column 140, and latches on the rear side 120*b* of the grille mesh 120 by passing through the corresponding mesh hole 121. In fact, the fixing column 140 and the fixing member 150 can be integrally formed on the back surface 131*b* of the body 13 or the back surface 162 of the spacer 161 to serve as a fastener self-provided by the body 13 or the spacer 161, such that the body 13 or the spacer 160 can be directly clipped onto the grille mesh 120 via the fastener. In other words, the indicator lamp 130, as well as the body 131, can function as a recessed lamp without requiring any additional components for fixation.

Figure 16:
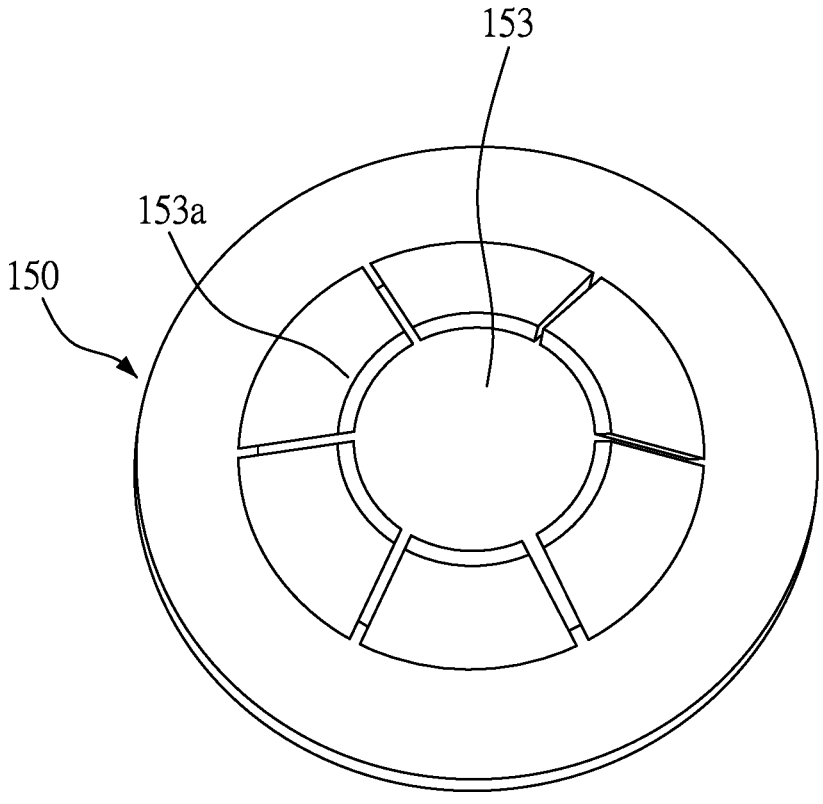
FIG. 16 is a top view of a fixing member in another specific embodiment of the disclosure.
Figure 17:
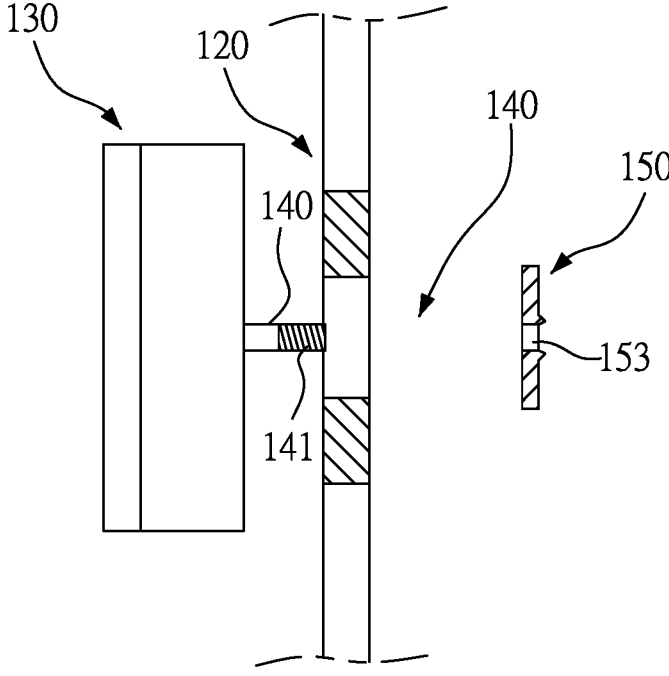
FIG. 17 is a cross-section view of some components in another specific embodiment of the disclosure.
Figure 18:
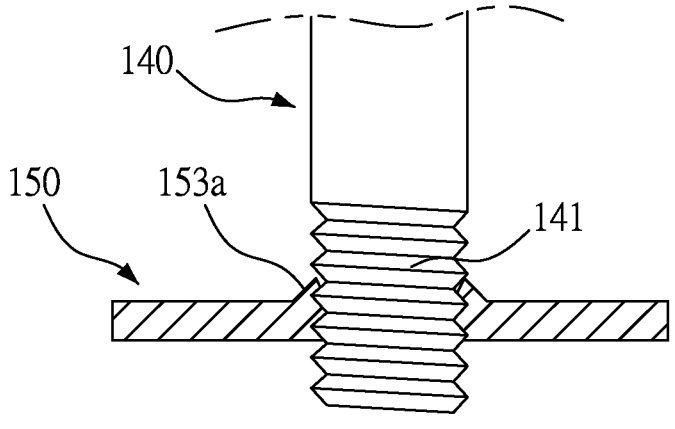
FIG. 18 is an enlarged cross-section view of some components in another specific embodiment of the disclosure.

Referring to FIG. 16 and FIG. 17, and FIG. 18, in one specific embodiment, the fixing member 150 is an annular buckle having a buckle hole 153 located at a center thereof. The buckle hole 153 is provided at the edge thereof with a plurality of elastic buckle pieces 153*a* for buckling on the surface of the fixing column 140. The surface of the fixing column 140 is formed with at least one annular groove 141 for the elastic buckle pieces 153*a* to be buckled into. The elastic buckle pieces 153*a* replace the nut, and can be quickly secured without the need for tools. For example, the elastic buckle pieces 153*a* are pressed by the user's hand to make that the elastic buckle pieces 153*a* are buckled into the annular grooves 141 of the fixing column 140. Besides, for the convenience of hand operation, the outer surface of the elastic buckle pieces 153*a* can be wrapped to form a suitable gripping part for easy handling.

Through the above combination, users can quickly replace the detachable indicator lamps 130 and arrange their desired combination of texts/patterns, without being limited to the manufactured configuration of the car radiator grille 100. Furthermore, the manufacturers do not need to prepare inventories for different combinations of texts/patterns on the car radiator grille 100. The manufacturers only have to install the corresponding combination of texts/patterns according to the purchase order when the products are going to be shipped, so as to minimize inventories.

The invention claimed is:

1. A car radiator grille, configured to be installed to a front end of a car, including:
a frame surrounding a hollow area;
a grille mesh, disposed in the hollow area, and including a plurality of mesh holes communicated with a front side and a rear side of the grille mesh;
an indicator lamp including a body and a light source, wherein the light source is disposed on a front surface of the body, and the body is disposed on the front side of the grille mesh;
a fixing member disposed on the rear side of the grille mesh; and
a fixing column connected to a back surface of the body and the fixing member by passing through one of the plurality of mesh holes so as to clamp the grille mesh between the body and the fixing member,
wherein the back surface of the body is configured with a plurality of inserting holes, the fixing column is a detachable member that is connected to the back surface of the body, and can be selectively inserted into one the plurality of inserting holes.

2. The car radiator grille according to claim 1, wherein the indicator lamp further includes a positioning rod that protrudes from the back surface of the body, and passes through one of the plurality of mesh holes.

3. The car radiator grille according to claim 1, wherein the indicator lamp further includes a positioning bump that protrudes from the back surface of the body and can be embedded into a correspondingly shaped mesh hole.

4. The car radiator grille according to claim 1, wherein the fixing column is a bolt, and the fixing member is a nut.

5. The car radiator grille according to claim 1, wherein the fixing column is a bolt, and the fixing member includes a nut and a hand-rotatable portion combined with the nut.

6. The car radiator grille according to claim 1, wherein the fixing member is a plate disposed on the rear side of the grille mesh; the fixing column is a bolt that passes through a back surface of the fixing member, and locks into the back surface of the body.

7. The car radiator grille according to claim 1, wherein the car radiator grille further includes a spacer that is disposed on the front side of the grille mesh, and located between the front side of the grille mesh and the back surface of the body.

8. The car radiator grille according to claim 7, wherein the spacer is provided with a back surface that matches a curvature of the front side of the grille mesh, and
provided with a front surface that matches a curvature of the back surface of the body.

9. The car radiator grille according to claim 8, wherein the spacer further includes a positioning rod that protrudes from the back surface of the spacer and passes through one of the plurality of mesh holes.

10. The car radiator grille according to claim 8, wherein the spacer further includes a positioning bump that protrudes from the back surface of the spacer and can be embedded into a correspondingly shaped mesh hole.

11. The car radiator grille according to claim 1, wherein the fixing column extends from the back surface of the body; the fixing member is a hook protruding from an end of the fixing column, and latches on the rear side of the grille mesh by passing through one of the plurality of mesh holes.

12. The car radiator grille according to claim 1, wherein the fixing member is an annular buckle having a buckle hole at a center thereof; the buckle hole is provided at an edge thereof with a plurality of elastic buckle pieces for buckling on a surface of the fixing column.

13. The car radiator grille according to claim 1, wherein a surface of the fixing column is formed with at least one annular groove for a plurality of elastic buckle pieces to be buckled into.

* * * * *